US008700356B2

(12) United States Patent
Lee et al.

(10) Patent No.: US 8,700,356 B2
(45) Date of Patent: Apr. 15, 2014

(54) APPARATUS AND METHOD SENSING MOTION

(75) Inventors: Bho Ram Lee, Seoul (KR); Won-Chul Bang, Seongnam-si (KR)

(73) Assignee: Samsung Electronics Co., Ltd., Suwon-Si (KR)

(*) Notice: Subject to any disclaimer, the term of this patent is extended or adjusted under 35 U.S.C. 154(b) by 688 days.

(21) Appl. No.: 12/923,488

(22) Filed: Sep. 23, 2010

(65) Prior Publication Data

US 2011/0077903 A1   Mar. 31, 2011

(30) Foreign Application Priority Data

Sep. 30, 2009   (KR) .................. 10-2009-0093408

(51) Int. Cl.
*G01C 9/00*   (2006.01)

(52) U.S. Cl.
USPC .......................................................... 702/151

(58) Field of Classification Search
USPC .......................................................... 702/151
See application file for complete search history.

(56) References Cited

U.S. PATENT DOCUMENTS

| 6,204,499 | B1* | 3/2001 | Schaefer | 250/231.1 |
| 7,158,118 | B2 | 1/2007 | Liberty | |
| 2010/0053164 | A1 | 3/2010 | Imai et al. | |
| 2010/0328210 | A1* | 12/2010 | Jeng et al. | 345/157 |

* cited by examiner

*Primary Examiner* — Tung S Lau
*Assistant Examiner* — Xiuquin Sun
(74) *Attorney, Agent, or Firm* — Staas & Halsey LLP

(57) ABSTRACT

Provided is a motion sensing apparatus that measures a first angle using at least one first rotational angle sensor, estimates a second angle using at least one second rotational angle sensor and at least one 2-axis angular velocity sensor that is different from the at least one first rotational angle sensor, and estimates a third angle using at least one third rotational angle sensor and the at least one 2-axis angular velocity sensor.

50 Claims, 14 Drawing Sheets

REFERENCE FRAME          BODY FRAME

APPARATUS AND METHOD SENSING MOTION

CROSS-REFERENCE TO RELATED APPLICATIONS

This application claims the benefit of Korean Patent Application No. 10-2009-0093408, filed on Sep. 30, 2009, in the Korean Intellectual Property Office, the disclosure of which is incorporated herein by reference.

BACKGROUND

1. Field

One or more embodiments relate to a motion sensing apparatus and method.

2. Description of the Related Art

Input information may be directly input, through a keypad, and the like, to a portable terminal or a hand-held type device. However, recently, information for such devices has been input through the sensing of motion information of a user using various sensors, and by analyzing the sensed motion information to sense an input signal of a corresponding device.

The inputting of the input signal based on the motion of the user is more intuitive compared with more traditional input/output (I/O) methods such through utilizing a button, a keyboard, and the like, and is capable of successively inputting the input signal, thereby providing a high utilization. Also, the inputting of the input signal based on the motion of the user may include calculating a rotational angle to estimate corresponding motion information.

An Attitude and Heading Reference system (AHRS) is widely used as a motion sensing apparatus, with the AHRS estimating a rotational angle by utilizing a 3-axis accelerometer sensor, a 3-axis angular velocity sensor, and a 3-axis geomagnetic sensor, for example.

A system that performs a 2-dimensional (2D) motion and receives heading information by a GPS receiver, may use an Attitude Reference system (ARS) that estimates the rotational angle using the 3-axis accelerometer sensor and the 3-axis angular velocity sensor, excluding the geomagnetic sensor from the AHRS, for example.

Still further, a method of estimating the motion information only using the 3-axis accelerometer sensor and the 3-axis angular velocity sensor may only calculate a relative rotational angle instead of an absolute rotational angle of an axis, which may result in errors due to drift, for example, and thus the method may be widely used for estimating a rotational angle of another axis in addition to the corresponding axis.

SUMMARY

According to an aspect of one or more embodiments, there may be provided an apparatus of sensing a motion, the apparatus including a first angle estimation unit to measure a first angle of an object with respect to a reference frame using at least one first rotational angle sensor, a second angle estimation unit to estimate a second angle of the object with respect to the reference frame using at least one second rotational angle sensor and at least one 2-axis angular velocity sensor that is different from the at least one first rotational angle sensor, and a third angle estimation unit to estimate a third angle of the object with respect to the reference frame using at least one third rotational angle sensor and the at least one 2-axis angular velocity sensor.

According to an aspect of one or more embodiments, there may be provided a user interface method, the method including sensing motion information of a terminal with respect to a reference frame, and controlling a display of at least one content on the terminal based on the sensed motion information.

According to an aspect of one or more embodiments, there may be provided a method of sensing a motion, the method including measuring a first angle of an object with respect to a reference frame using at least one first rotational angle sensor estimating a second angle of the object with respect to the reference frame using at least one second rotational angle sensor and at least one 2-axis angular velocity sensor that is different from the at least one first rotational angle sensor, and estimating a third angle of the object with respect to the reference frame using at least one third rotational angle sensor and the at least one 2-axis angular velocity sensor.

According to an aspect of one or more embodiments, there may be provided a method of sensing a motion, the method including measuring a first angle of an object with respect to a reference frame using at least one first rotational angle sensor, estimate plural second angles of the object with respect to the reference frame based on the measured first angle, at least one second rotational angle sensor, and at least one 2-axis angular velocity sensor that is included in a separate physical sensor device from the at least one first rotational angle sensor, estimating plural third angles of the object with respect to the reference frame using at least one third rotational angle sensor and the at least one 2-axis angular velocity sensor, and controlling an operation of a mobile device based on motion information represented by the measured first angle, estimated plural second angles, and estimated plural third angles.

According to an aspect of one or more embodiments, there may be provided a mobile device sensing motion, the apparatus including a display, a rotational angle sensor including a first rotational sensor, a second rotational sensor, and a third rotational sensor, a 2-axis angular velocity sensor, with the 2-axis angular velocity sensor being included in a separate physical sensor device from one or more sensor devices including the rotational angle sensor, and a controller controlling an operation of the mobile device based on sensed motion information defined by a measured first angle, estimated plural second angles, and estimated plural third angles, with the measured first angle of the mobile device being measured with respect to a reference frame using the first rotational angle sensor, the estimated plural second angles of the mobile device being estimated with respect to the reference frame using the second rotational angle sensor and the 2-axis angular velocity sensor, and the estimated plural third angles of the mobile device being estimated with respect to the reference frame using the third rotational angle sensor and the 2-axis angular velocity sensor.

Additional aspects, features, and/or advantages of embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the embodiments, taken in conjunction with the accompanying drawings of which.

DETAILED DESCRIPTION

Figure 1:
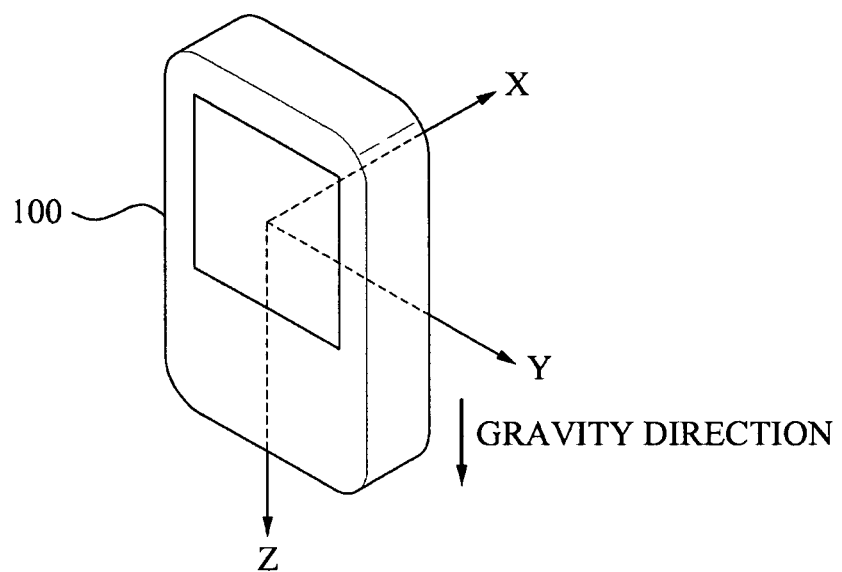
FIG. 1 is a diagram illustrating a motion sensing apparatus, according to one or more embodiments.

Reference will now be made in detail to one or more embodiments, illustrated in the accompanying drawings, wherein like reference numerals refer to like elements throughout. In this regard, embodiments of the present invention may be embodied in many different forms and should not be construed as being limited to embodiments set forth herein. Accordingly, embodiments are merely described below, by referring to the figures, to explain aspects of the present invention.

Figure 2:
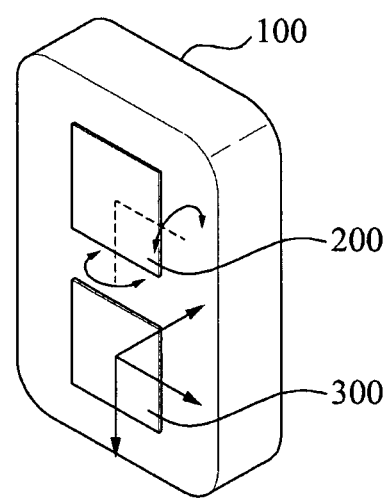
FIG. 2 is a diagram illustrating an element included in a motion sensing apparatus, according to one or more embodiments.

FIG. 1 illustrates a motion sensing apparatus 100, according to one or more embodiments, and FIG. 2 illustrates an element included in the motion sensing apparatus 100, according to one or more embodiments.

Although the motion sensing apparatus 100 may be applied in various fields, for each description, the motion sensing apparatus 100 will be described based on an embodiment where the motion sensing apparatus is applied to a portable device, noting that alternative applications are equally available.

Motion information of the motion sensing apparatus 100, according to one or more embodiments, may be expressed in 3-axes in three dimensions (3D), for example, as illustrated in FIG. 1. The motion sensing apparatus 100 may estimate a change of the motion information using a rotational angle sensor 200 and a 2-axis angular velocity sensor 300 included in the motion sensing apparatus 100, as illustrated in FIG. 2.

The rotational angle sensor, according to one or more embodiments, may include various types of sensors that measure a rotational angle, such as an accelerometer sensor, as only examples, or may include any combination of the various types of sensors.

The rotational angle sensor, according to one or more embodiments, may include various types of sensors that measure the rotational angle, such as the accelerometer sensor, an infrared (IR) sensor, an ultrasound sensor, a geomagnetic sensor, a camera, a global positioning system (GPS), and the like, as only example, or may include any combination of the sensors.

Although the motion sensing apparatus is described based on the accelerometer sensor for ease of description, the motion sensing apparatus is not limited to such an accelerometer sensor.

Figure 3:
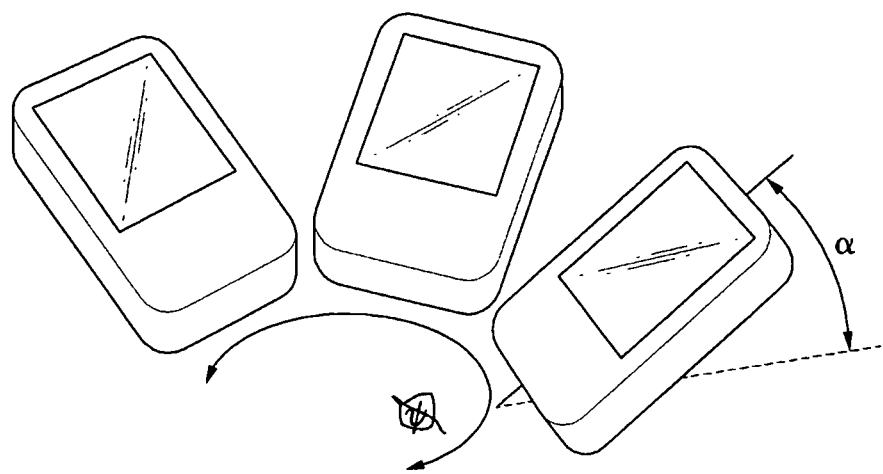
FIG. 3 is a diagram illustrating a change in a rotational angle based on a motion of the motion sensing apparatus, according to one or more embodiments.

FIG. 3 illustrates a change in a rotational angle based on a sensed motion of the motion sensing apparatus, according to one or more embodiments.

The motion sensing apparatus 100, according to one or more embodiments, may determine motion information by estimating the rotational angle, because the motion sensing apparatus 100 may be caused to freely perform a rotary motion with a tilting angle α with reference a horizontal plane, the tilting angle continuously having a value that is different from zero as the motion sensing apparatus 100 is rotated.

The motion sensing apparatus 100 may provide a method of estimating a conversion relation of a rotational angle, and the motion information may be determined based on the conversion relation of the rotational angle.

Figure 4:
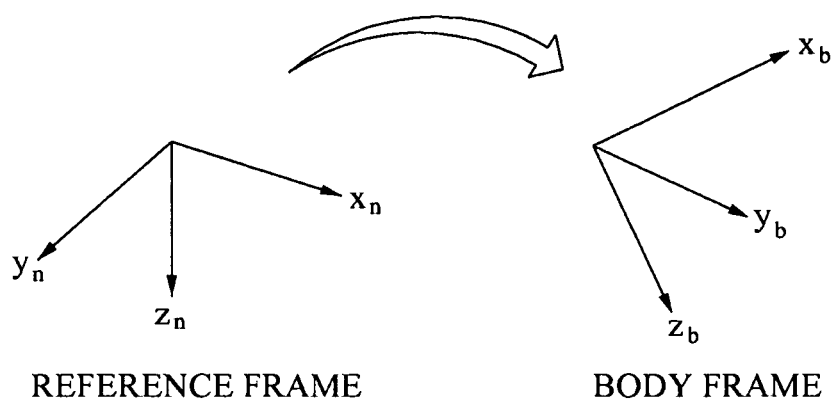
FIG. 4 is a diagram illustrating a relative rotation of a reference frame and a body frame fixed on a target object or an object, according to one or more embodiments.
Figure 5:
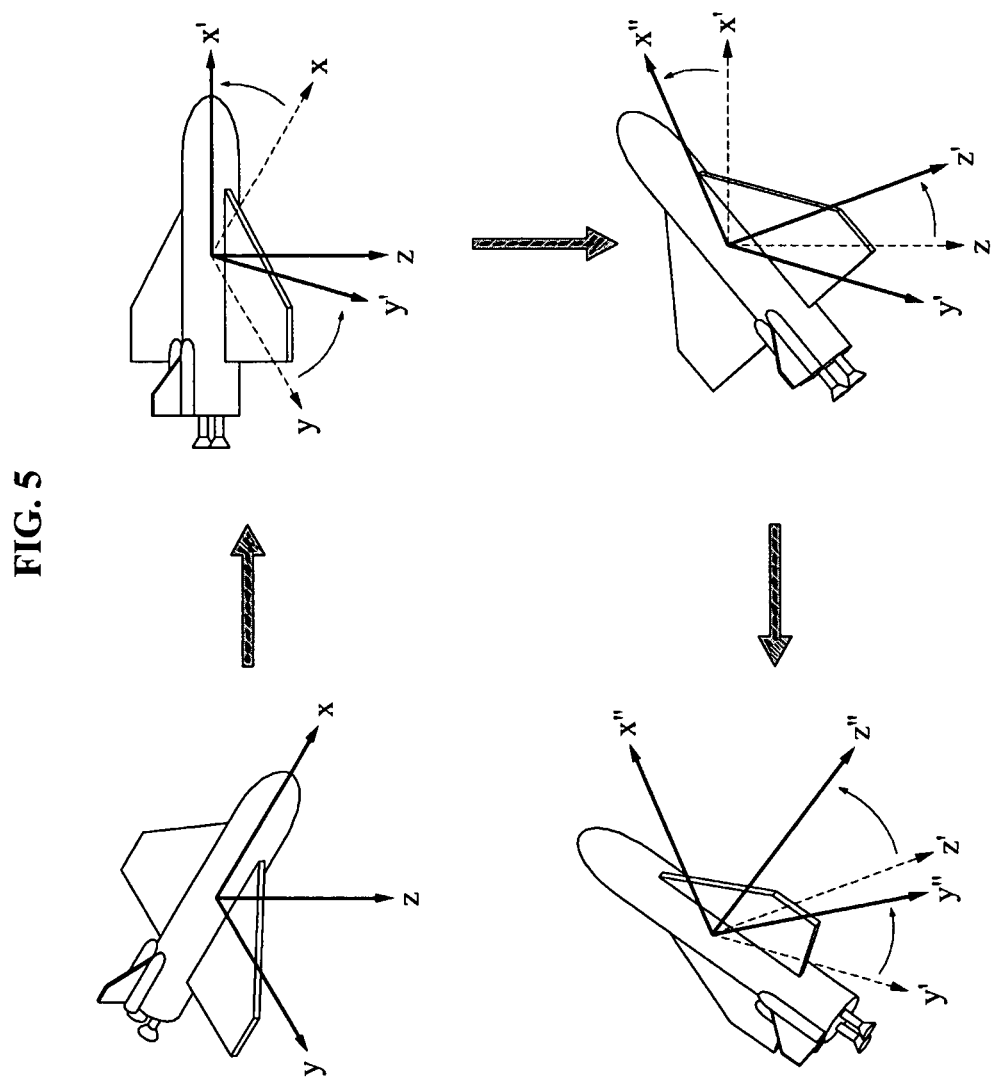
FIG. 5 is a diagram illustrating a sequential rotation representation of an Euler angle, according to one or more embodiments.

FIG. 4 illustrates a relative rotation of a reference frame, with axes $x_n$, $y_n$, and $z_n$, and a body frame, with axes $x_b$, $y_b$, and $z_b$, fixed on a target object or an object, and FIG. 5 illustrates a sequential rotation representation of an Euler angle, according to one or more embodiments.

A rotational angle to be estimated by the motion sensing apparatus 100 according to one or more embodiments may be estimated based on the degree of the rotation of the reference frame and the degree of the rotation of the body frame, e.g., fixed on the target object or the object. Below, rotational angles will be described based on a roll, a pitch, and a yaw that are defined by an Euler angle, as illustrated in FIG. 5. The sequencing through the illustrations of FIG. 5 shows these commonly understood roll, pitch, and yaw rotational angle descriptions. For example, rotation with respect to the illustrated front-to-back x axis is called roll, rotation with respect the illustrated side-to-side y axis is called pitch, and rotation with respect to the illustrated vertical axis z is called yaw. Thus, FIG. 5 illustrates a plane that first has only roll and pitch changes, then only further roll and yaw changes, and finally only further pitch and yaw changes. Herein, roll angles will be referred to as angles $\phi$, pitch angles will be referred to as angles $\theta$, and yaw angles will be referred to as angles $\psi$.

The motion sensing apparatus 100 may express the rotational angle based on various methods, such as, a 3×3 Direction Cosine Matrix (DCM), the Euler angle, a Quaternion, and the like, and for only ease of description, again, the rotational angle will be described based on the roll, pitch, and yaw that are defined by the Euler angle illustrated in FIG. 5. Here, the 3×3 DCM indicates a 3D rotation conversion, the Euler angle expresses a rotation based on 3-axis according to a series of sequence, and the Quaternion expresses the rotational angle based on a rotation directional vector and a size of the rotation, again, as only examples.

In an embodiment, when a value of a subtraction between successive frames input to a camera is applied to an image processing method that extracts a motion vector, such as an optical flow, and the like, the motion sensing apparatus may sense an up-and-down motion and a left-and-right motion of the camera.

Figure 6:
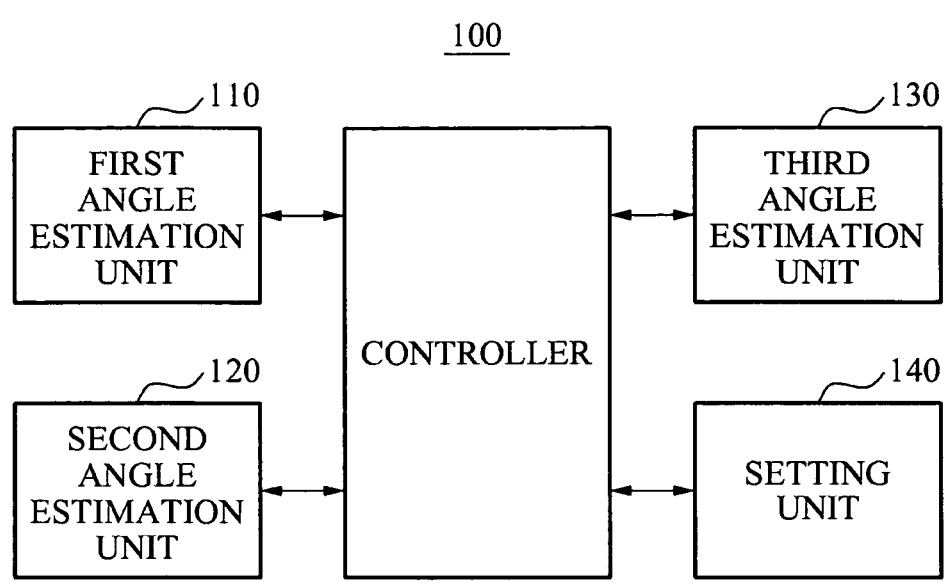
FIG. 6 is a block diagram illustrating a configuration of a motion sensing apparatus, according to one or more embodiments.

FIG. 6 illustrates a configuration of the motion sensing apparatus 100, according to one or more embodiments.

The motion sensing apparatus 100 may include a first estimation unit 110, a second estimation unit 120, and a third estimation unit 130, for example.

The first estimation unit 110 of the motion sensing apparatus 100 may measure a first angle using at least one first rotational angle sensor.

Specifically, the first angle estimation unit 110 may measure the first angle based on an output signal of the at least one first rotational angle sensor. In an embodiment, the first angle estimation unit 110 may calculate the first angle, namely, a roll angle $\phi$ of an Euler angle among rotational angles, based on the output signal of the at least one first rotational angle sensor.

In this instance, when another rotational angle sensor used for the first angle exists, the first angle estimation unit 110 may measure the first angle using the other rotational angle sensor.

Also, when a number of the measured first angles is greater than or equal to two, the first angle estimation unit 110 may estimate one of the angles based on an angle estimation algorithm. In an embodiment, when the number of the measured first angles is greater than or equal to two, the first angle estimation unit 110 may estimate an optimal first angle based on an algorithm, such as a Kalman filter.

In this instance, the motion sensing apparatus 100, according to one or more embodiments, may calculate the first angle using various rotational angle sensors. In an embodiment, the first angle may be measured by at least one of various types of sensors that measure a rotational angle, such as the accelerometer sensor, an IR sensor, an ultrasound sensor, a geomagnetic sensor, a camera, a GPS, and the like, as only examples.

A second angle estimation unit 120 of the motion sensing apparatus 100 may estimate a second angle using at least one second rotational angle sensor and at least one 2-axis angular velocity sensor that is different from the at least one second rotational angle sensor, for example.

The second angle estimation unit 120, according to one or more embodiments, may estimate the second angle based on the first angle calculated based on the output signal of the first rotational angle sensor and based on an output signal of the 2-axis angular velocity sensor.

In this instance, the second angle estimation unit 120 may estimate the second angle using the 2-axis angular velocity sensor and another rotational angle sensor that is different from a rotational angle sensor used by the first angle estimation unit 110, for example.

The at least one first rotational angle sensor and the at least one second rotational angle sensor may be identical to each other or may be different from each other.

In an embodiment, the second angle estimation unit 120 may combine a pitch angle of the other rotational angle sensor, which is calculated based on an output signal of the rotational angle sensor, a rotational angle that is the first angle calculated by the first angle estimation unit 110, and a pitch angle of a 2-axis angular velocity sensor 300, which is calculated based on an output signal of the 2-axis angular velocity sensor 300, thereby estimating a final pitch angle $\theta$, namely, the second angle.

When a number of the measured second angles is greater than or equal to two, the second angle estimation unit 120 may estimate one of the angles based on an angle estimation algorithm.

In one or more embodiments, the motion sensing apparatus 100 may estimate the second angle based on a Kalman filter and the like, to appropriately reflect a characteristic of the pitch angle obtained based on the output signal of the at least one first rotational angle sensor and a characteristic of the pitch angle obtained based on the output signal of the angular velocity sensor 300 while the pitch angles are combined.

A third angle estimation unit 130 of the motion sensing apparatus 100 may estimate a third angle using at least one third rotational angle sensor and the at least one 2-axis angular velocity sensor.

The third angle estimation unit 130 may estimate the third angle based on the first angle, the second angle, and an output signal of the at least one 2-axis angular velocity sensor.

In an embodiment, the third angle estimation unit 130 may estimate and may calculate a final yaw angle $\psi$ that is the third angle, using a rotational angle that is the first angle, a pitch angle that is the second angle, and an output signal of a 2-axis angular velocity sensor.

When a number of the estimated third angles is greater than or equal to two, the third angle estimation unit 130 may estimate one of the angles based on the angle estimation algorithm. In an embodiment, when the number of the estimated third angles is greater than or equal to two, an optimal third angle may be estimated based on an algorithm, such as a Kalman filter.

When the second angle is outside a range of predetermined threshold values, the motion sensing apparatus 100 may further include a setting unit 140 that may either control the system to perform estimation for the third angle or set the third angle as a predetermined value, the second angle being estimated based on a predetermined tilting angle and the output signal of the at least one 2-axis angular velocity.

The setting unit 140 may check a tilting value $\alpha$ of the motion sensing apparatus 100, and, when the yaw angle has a value outside a range of the predetermined threshold values, the setting unit 140 may regard a calculation of the yaw angle as a meaningless operation and may control the system to either not calculate the yaw angle or to set the yaw angle as a predetermined value. Here, the yaw angle is the third angle calculated based on the tilting angle and the output signal of the 2-axis angular velocity sensor 300.

In this instance, a basic definition of the tilting angle is a rotary motion performed when an observability of a rotary motion of a corresponding axis is lost or a rotational angle of when the observability of the rotary motion of the corresponding axis is lost. Also, the tilting angle according to one or more embodiments may be defined to be determined based on an absolute value of the second angle, i.e., a pitch angle.

The setting unit 140 may reset the third angle based on information associated with the third angle.

In an embodiment, when it is determined that a user moves a portable device including the motion sensing apparatus 100 to a location to view a screen of the portable device, the setting unit 140 may further set the yaw angle that is the third angle as a predetermined value, such as "0", depending on an utilization field or demands.

Figure 7:
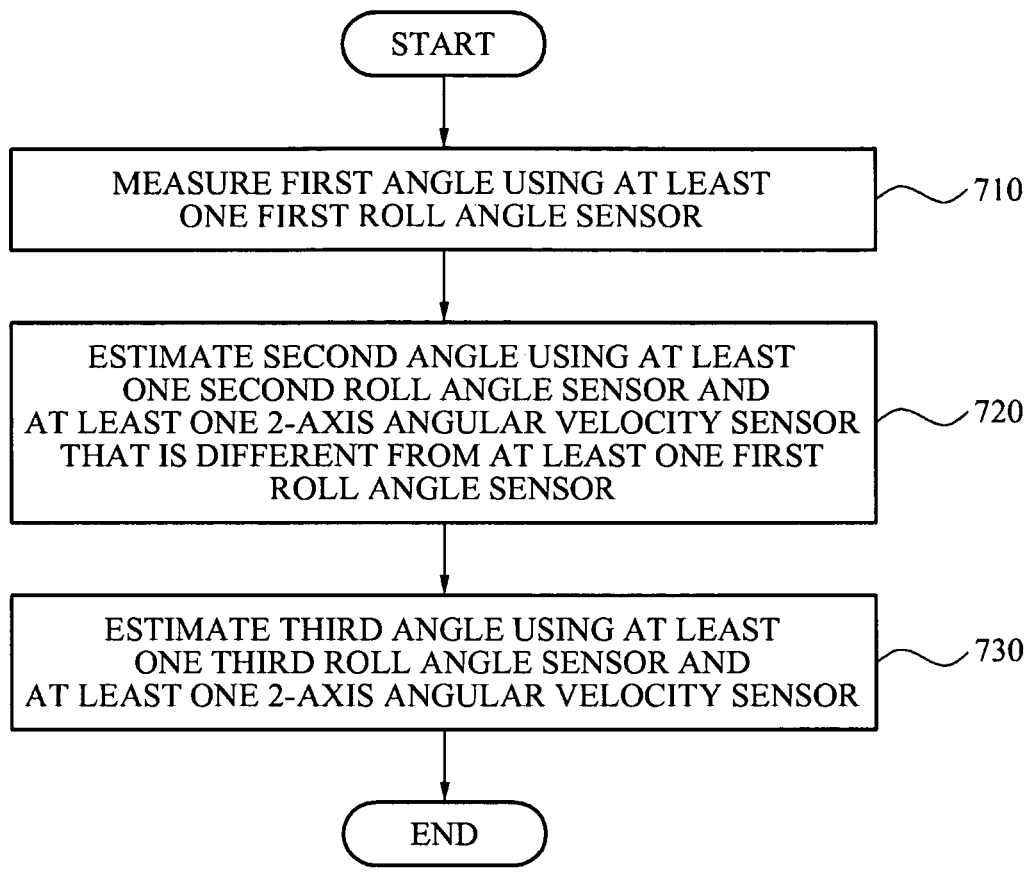
FIG. 7 is a flowchart illustrating a motion sensing method, according to one or more embodiments.

FIG. 7 illustrates a motion sensing method, according to one or more embodiments.

A method of estimating a rotational angle based on a motion sensing method will be described with reference to FIG. 7. In this instance, a method of calculating the rotational angle based on a provided Equation is only an example and the method may not be limited thereto. In addition, as only an example, method operations of FIG. 7 may be performed at least by the motion sensing apparatus 100, described above. Further, similar to above, the described first angle will be referred to as a roll angle ϕ, the described second angle will be referred to as a pitch angle θ, and the described third angle will be referred to as the yaw angle ψ.

A first angle may be calculated using at least one rotational angle sensor, in operation 710.

In an embodiment, a roll angle ϕ, as the first angle, and a pitch angle θ of the rotational angle sensor may be calculated through the below Equations 1 and 2, as only examples, based on an output signal of the at least one first rotational angle sensor.

$$\phi_a = \tan^{-1}\left(\frac{a_y}{a_z}\right) \quad \text{Equation 1}$$

$$\theta_a = \tan^{-1}\left(\frac{a_x}{\sqrt{(a_y^2 + a_z^2)}}\right) \quad \text{Equation 2}$$

A relational expression between a time propagation of an Euler angle, variation of an Euler angle, and an angular velocity in a 3D rotary motion may be expressed as given in the below Equation 3, for example.

$$\begin{bmatrix} \dot{\phi} \\ \dot{\theta} \\ \dot{\psi} \end{bmatrix} = \begin{bmatrix} 1 & \tan\theta\sin\phi & \tan\theta\cos\phi \\ 0 & \cos\phi & \sin\phi \\ 0 & \sec\theta\sin\phi & \tan\theta\cos\phi \end{bmatrix} \begin{bmatrix} \omega_x \\ \omega_y \\ \omega_z \end{bmatrix} \quad \text{Equation 3}$$

Estimates of the second angle may be sensed using at least one second rotational angle sensor and at least one 2-axis angular velocity sensor that is different from the at least one first rotational angle sensor, in operation 720.

The third angle may also be estimated using at least one third rotational angle sensor and the at least one 2-axis angular velocity sensor, in operation 730.

According to one or more embodiments, below Equation 4 and Equation 5, as only example, may be calculated by substituting an output signal of the 2-axis angular velocity sensor based on Equation 3, for example. Here, Equation 4 and Equation 5 may calculate rate information of the pitch angle θ, as the second angle, and rate information of the yaw angle ψ, as the third angle.

$$\dot{\theta} = \omega_y \cos\phi + \omega_z \sin\phi \quad \text{Equation 4}$$

$$\dot{\psi} = \omega_y \sec\theta \sin\phi + \omega_z \tan\theta \cos\phi \quad \text{Equation 5}$$

In calculating the pitch angle θ based on Equation 4, which calculates a rate of change of the pitch angle θ, as the second angle, the roll angle ϕ, which is calculated by applying an output signal of the rotational angle sensor to Equation 1, may be used in Equation 4, and Equation 4 may then be integrated.

Additionally, the pitch angle θ, as the second angle, may accordingly be calculated by integrating a discretized equation such as the below Equation 6, for example, and the pitch angle θ may be calculated using a numerical integration that is generally applicable to a digital signal, such as Runge-Kutta method.

$$\theta_{g,k} = (\omega_y \cos\phi_a + \omega_z \sin\phi_a) \cdot dt + \hat{\theta}_{k-1} \quad \text{Equation 6}$$

When the motion sensing apparatus 100 calculates a yaw angle ψ based on Equation 5 that calculates a rate of change of the yaw angle ψ, the motion sensing apparatus 100 may apply to Equation 5 the roll angle ϕ calculated by applying the output signal of the rotational angle sensor to Equation 1 and the pitch angle θ calculated by Equation 4. The roll angle ϕ calculated by the applying of the output signal of the rotational angle sensor to Equation 1 and the pitch angle θ calculated by Equation 4 may be further applied to Equation 6, and Equation 6 may be integrated.

The yaw angle ψ, as the third angle may also be calculated by integrating a discretized equation, such as the below Equation 7, as an example, and the yaw angle ψ may be calculated using the numerical integration that is generally applicable to a digital signal, such as Runge-Kutta method.

$$\psi_{g,k} = (\omega_y \sec\theta_g \sin\phi_a + \omega_z \tan\theta_g \cos\phi_a) \cdot dt + \psi_{g,k-1} \quad \text{Equation 7}$$

Here, for Equation 7, the used pitch angle θ, as the second angle, may be calculated based on the output signal of the rotational angle sensor, may be calculated based on the output signal of the angular velocity sensor, or may be calculated by combining both signals.

According to one or more embodiments, a Kalman filter (KF) compensating for characteristics of the two sensors may compensate for the pitch angle θ.

The motion sensing apparatus 100 may be applied to one or more user interface devices that control displaying, on a terminal, of information in various schemes according to a motion of the terminal, for example.

The contents may be naturally displayed according to motion information associated with a vertical motion or horizontal motion of the terminal, such as up-and-down, right-and-left, panning-tilting, and the like. The user interface device may control the displaying of the contents using a 2-axis angular velocity sensor of the motion sensing device 100.

The interface device may measure a location of the terminal, a rotational angle, and the like, and may use the measured information as user interface information.

Figure 8:
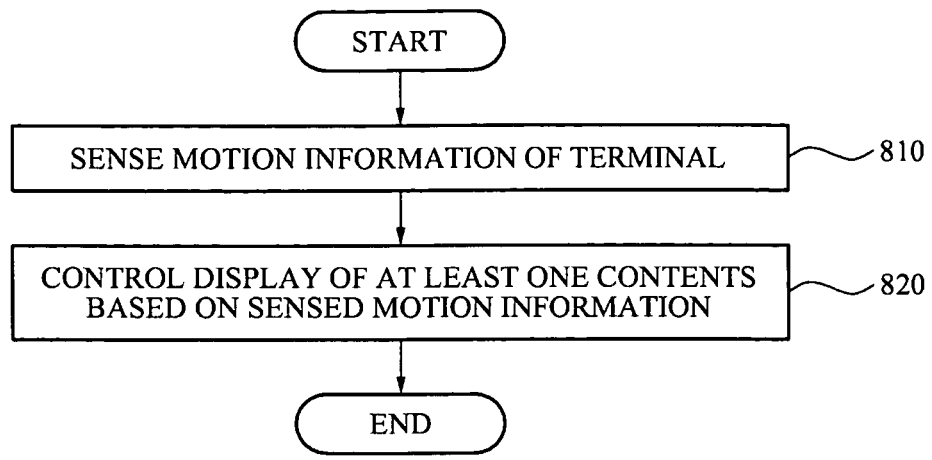
FIG. 8 is flowchart illustrating a user interface method, according to one or more embodiments.

Hereinafter, a user interface method using the user interface device will be described with reference to FIG. 8, according to one or more embodiments.

A user interface device senses motion information of a terminal, in operation 810, and controls displaying of at least one content based on the sensed motion information, in operation 820.

Figure 9:
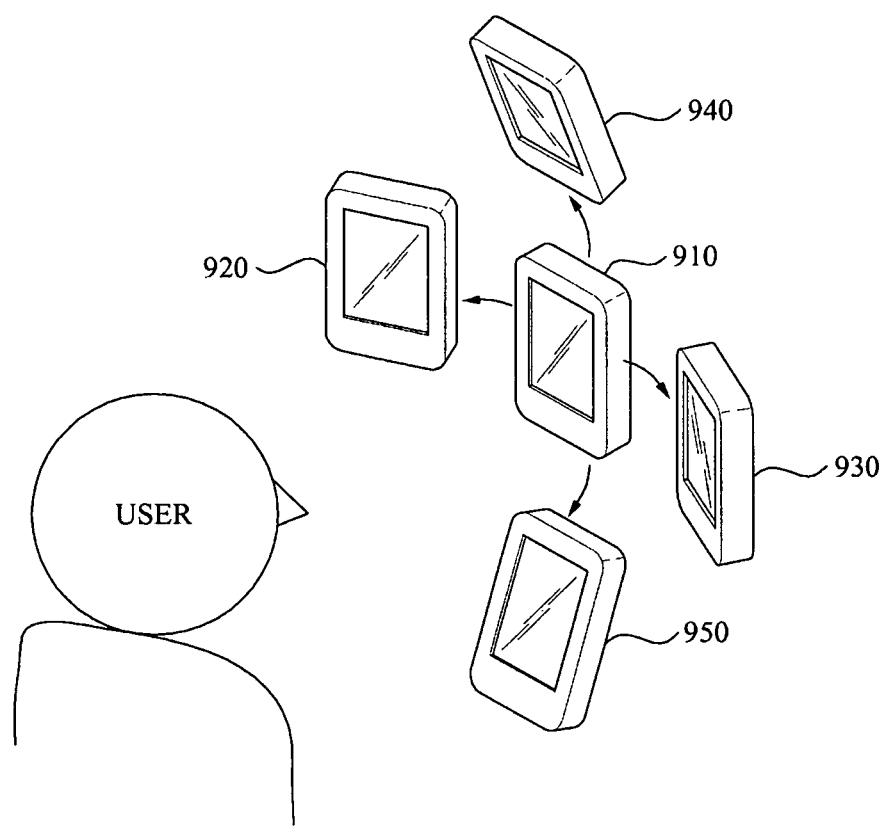
FIG. 9 is a diagram illustrating an example of manipulation based on a horizontal motion or a vertical motion of a user interface device, according to one or more embodiments.

FIG. 9 illustrates a manipulation based on a horizontal motion or a vertical motion of a user interface device, according to one or more embodiments.

The motion information according to one or more embodiments may include vertical motion information of a terminal when the terminal is located in a location 920 or a location 930 or may be horizontal motion information of the terminal when the terminal is located in a location 940 or motion information of the terminal when the terminal is located at a location 950, with motion information of the terminal when the terminal is located at a location 910. Here, as an example, a user may cause the terminal to be located at any of these locations, as well as move between the same. In an embodiment, the horizontal motion information may include horizontal information that is a measurement of a velocity of a horizontal motion of the terminal, an angular velocity of the horizontal motion, a distance of the horizontal motion, and a rotational angle of the horizontal motion; and the vertical motion information may include vertical information that is a measurement of a velocity of a vertical motion of the terminal, an angular velocity of the vertical motion, a distance of the vertical motion, and a rotational angle of the vertical motion.

The motion information according to one or more embodiments may include information associated with a location and a rotational angle that are changed according to the motion of the terminal.

Figure 10:
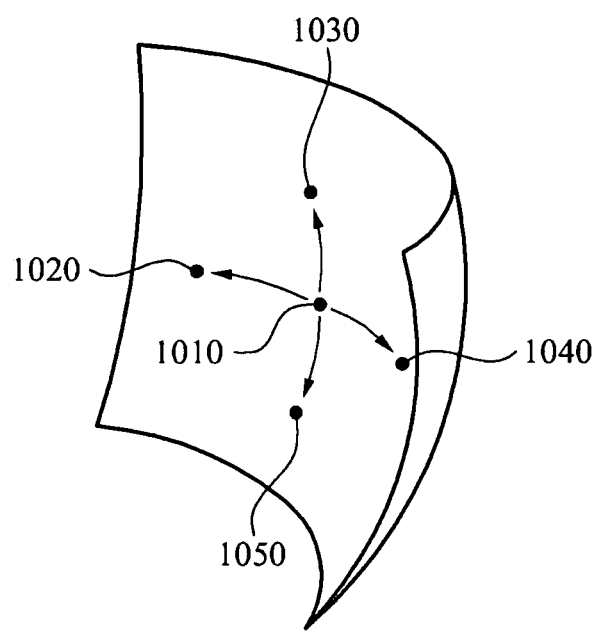
FIG. 10 is a diagram illustrating an example of a change of motion information based on a movement of a terminal, according to one or more embodiments.
Figure 11:
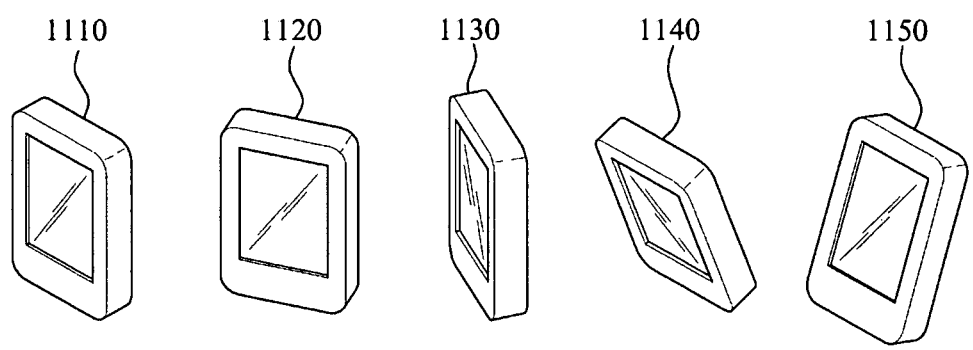
FIG. 11 is a diagram illustrating an example of a change of motion information based on a change in a rotational angle of a terminal, according to one or more embodiments.

FIG. 10 illustrates a change of motion information based on a movement of a terminal, according to one or more embodiments, and FIG. 11 illustrates a change of the motion information based on a change in a rotational angle of the terminal, according to one or more embodiments.

In an embodiment, when a user interface device of FIG. 10 recognizes that the terminal located in a location 1010 horizontally moves to a location 1020 or to a location 1030, the user interface device may generate, as motion information, horizontal information based on the horizontal motion. When the user interface device recognizes that the terminal located in the location 1010 vertically moves to a location 1040 or to a location 1050, the user interface device may generate, as the motion information, vertical information based on the vertical motion.

In an embodiment, when the terminal in a state 1110 horizontally rotates to a state 1120 or to a state 1130, the user interface device may generate, as the motion information, a rotational angle based on the horizontal rotation, and when the terminal in the state 1110 vertically rotates to a state 1140 or to a state 1150, the user interface device may generate, as the motion information, a rotational angle based on the vertical rotation.

The terminal may include various devices sensing a motion of the user, and the motion information may be horizontal or vertical motion information sensed by at least one of the various devices.

The user interface device may be applied to a handheld terminal, a wearing terminal for a head or an eye, and the like, as only examples.

Accordingly, the motion information sensed by the user interface device may be horizontal or vertical motion information of the handheld terminal that is only one example of the terminal, noting that alternatives are available.

Also, the motion information sensed by the user interface device may be horizontal or vertical motion information of the wearing terminal for the head or the eye, such as the head mounted display (HMD) terminal that is, again, only one example of the terminal, noting that alternatives are available.

Although a method of sensing the motion information based a motion of the user interface device has or will be described, the method of sending the motion information is not limited thereto.

Thus, in one or more embodiment, the user interface device senses the motion information of the terminal through measuring a first angle corresponding to the motion information and measuring a second angle corresponding to the motion information.

When measuring the first angle, the user interface device may estimate the first angle based on vertical information measured by at least one rotational angle sensor and at least one 2-axis angular velocity sensor. In this instance, the first angle may be tilt information measured based on the vertical information.

The user interface device may use, as the rotational angle sensor, at least one of an accelerometer sensor, an IR sensor, an ultrasound sensor, a geomagnetic sensor, a camera, and a GPS, as only examples.

When measuring the second angle, the user interface device may estimate the second angle based on the first angle and horizontal information measured by the at least one 2-axis angular velocity sensor.

The second angle may be panning information estimated based on the first angle and the horizontal information measured by the 2-axis angular velocity sensor.

When the user interface device controls displaying of at least one content based on the sensed motion information, the user interface device may display a portion of an area or an entire area of the contents on the terminal, and may change a spatial visible area of the portion of the area or the entire area of the contents based on the motion information.

Figure 12:
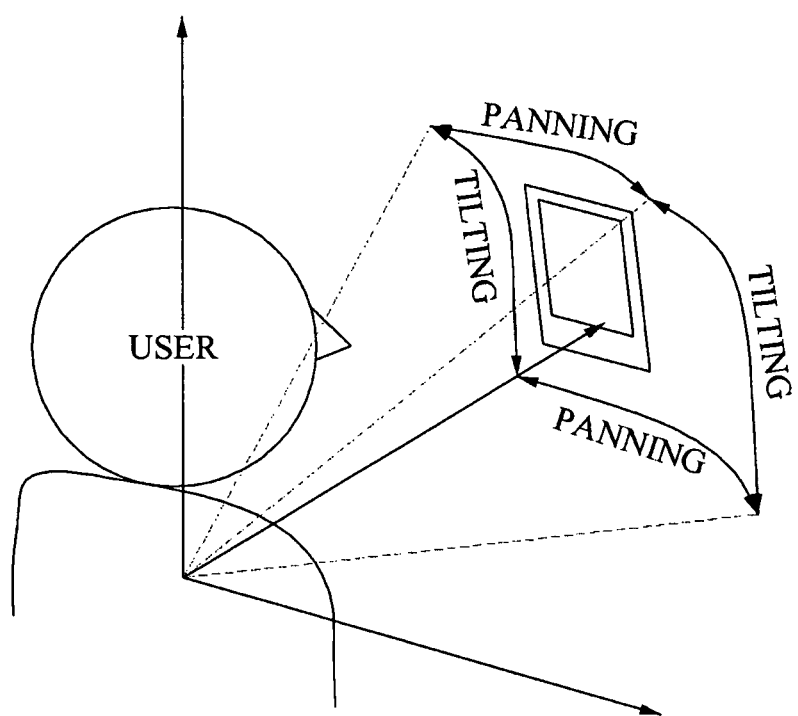
FIG. 12 is a diagram illustrating an embodiment using an interface device, according to one or more embodiments.
Figure 13:
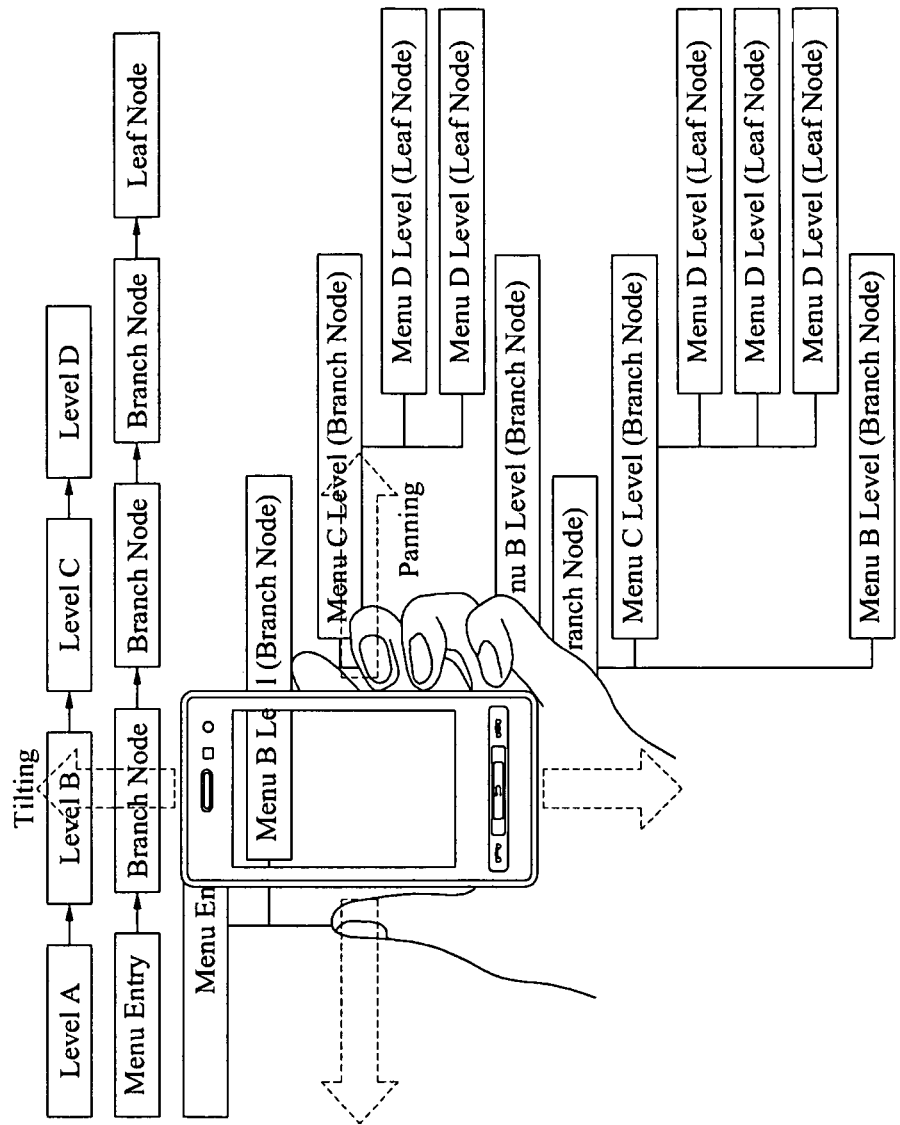
FIG. 13 is a diagram illustrating an another embodiment using an interface device, according to one or more embodiments.
Figure 14:
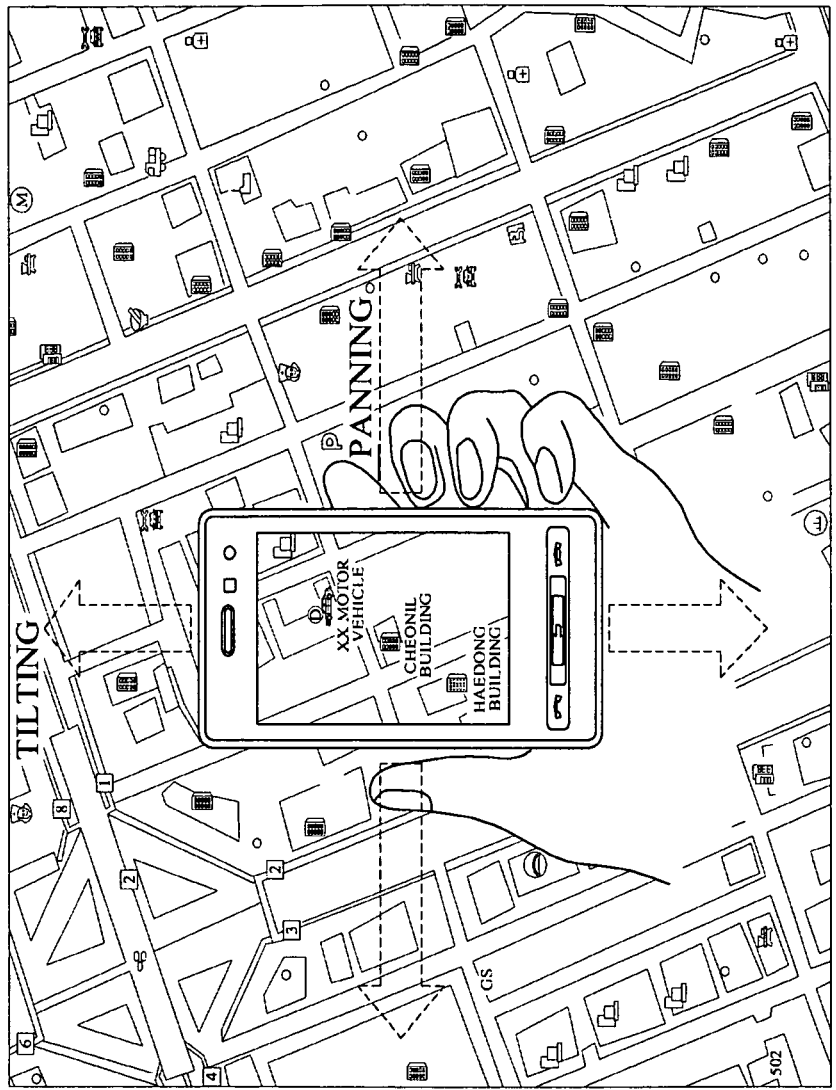
FIG. 14 is a diagram illustrating still another embodiment using an interface device, according to one or more embodiments.

As illustrated in FIGS. 12 through 14, the interface device, according to one or more embodiments, may perform displaying by continuously moving, to a direction corresponding to the motion information, the portion of the area or the entire area of the contents.

FIG. 12 illustrates an embodiment using an interface device according to one or more embodiments, FIG. 13 illustrates an embodiment of using an interface device according to one or more embodiments, and FIG. 14 illustrates an embodiment using an interface device, according to one or more embodiments, noting that alternatives are equally available.

Thus, as only an example, a user changes motion information by moving, up-and-down or panning-and-tilting, a terminal including the interface device as illustrated in FIG. 12. Accordingly, the interface device may control information to be automatically moved to be displayed by moving the terminal itself as though a background being displayed behind the terminal is viewed through a display window of the terminal, as opposed to touching displayed information to move the information A user may display menu tree information to be moved to based on movement, such as up-and-down, panning-and-tilting, and the like, of the terminal including the interface device as illustrated in FIG. 13. Here, for example, the differently displayed menu information that may currently be displayed may be selected by the user, e.g., through a user input device. Further, FIG. 14 illustrates a map being displayed to a user, with a part of a map being intuitively moved to, to be displayed by simply moving the terminal without touching or manipulating a button. Here, the entire map may not necessarily need to be fully rendered by the terminal, e.g., the terminal may receive only corresponding rendered portions of the map that are needed to display the displayed portions, for example, based upon motion information that may be provided to a service that is providing the map information, e.g., in a rendered or non-rendered form. Though only the corresponding portion is described as being provided to terminal, the portions of the map provided to the terminal may be greater than a displayed portion corresponding to the current location.

The user interface device may hold a scene of contents being displayed to not be changed in at least one content based on the motion information, for example.

The user interface device may measure motion information based on a movement of the terminal, and may also control whether to have a change in the display of the contents based on to the motion information.

Specifically, the user may additionally move/control information displayed on the terminal by lifting a mouse or a finger to move an icon and the like on a mouse pad or a touch screen of the terminal.

In one or more embodiments, apparatus, system, and unit descriptions herein include one or more hardware processing devices, i.e., processing elements. For example, each described unit may include one or more processing elements, desirable memory, movement and/or acceleration sensors, and any desired hardware input/output transmission devices. Further, the term apparatus should be considered synonymous with elements of a physical system, not limited to a single enclosure or all described elements embodied in single respective enclosures in all embodiments, but rather, depending on embodiment, is open to being embodied together or separately in differing enclosures and/or locations through differing hardware elements.

In addition to the above described embodiments, embodiments can also be implemented through computer readable code/instructions in/on a non-transitory medium, e.g., a computer readable medium, to control at least one processing device, such as a processor or computer, to implement any above described embodiment. The medium can correspond to any defined, measurable, and tangible structure permitting the storing and/or transmission of the computer readable code.

The media may also include, e.g., in combination with the computer readable code, data files, data structures, and the like. One or more embodiments of computer-readable media include magnetic media such as hard disks, floppy disks, and magnetic tape; optical media such as CD ROM disks and DVDs; magneto-optical media such as optical disks; and hardware devices that are specially configured to store and perform program instructions, such as read-only memory (ROM), random access memory (RAM), flash memory, and the like. Computer readable code may include both machine code, such as produced by a compiler, and files containing higher level code that may be executed by the computer using an interpreter, for example. The media may also be a distributed network, so that the computer readable code is stored and executed in a distributed fashion. Still further, as only an example, the processing element could include a processor or a computer processor, and processing elements may be distributed and/or included in a single device.

While aspects of the present invention has been particularly shown and described with reference to differing embodiments thereof, it should be understood that these embodiments should be considered in a descriptive sense only and not for purposes of limitation. Descriptions of features or aspects within each embodiment should typically be considered as available for other similar features or aspects in the remaining embodiments. Suitable results may equally be achieved if the described techniques are performed in a different order and/or if components in a described system, architecture, device, or circuit are combined in a different manner and/or replaced or supplemented by other components or their equivalents.

Thus, although a few embodiments have been shown and described, with additional embodiments being equally available, it would be appreciated by those skilled in the art that changes may be made in these embodiments without departing from the principles and spirit of the invention, the scope of which is defined in the claims and their equivalents.

What is claimed is:

1. An apparatus of sensing a motion, the apparatus comprising:
   a first angle estimation unit to measure a first angle of an object with respect to a reference frame using at least one first rotational angle sensor;
   a second angle estimation unit to estimate a second angle of the object with respect to the reference frame using at least one second rotational angle sensor, a rotational angle corresponding to the first angle of the object with respect to the reference frame, and at least one 2-axis angular velocity sensor that is different from the at least one first rotational angle sensor; and
   a third angle estimation unit to estimate a third angle of the object with respect to the reference frame using at least one third rotational angle sensor and the at least one 2-axis angular velocity sensor.

2. The apparatus of claim 1, wherein, when the first estimation unit estimates plural first angles, and when a number of the estimated first angles is greater than or equal to two, the first angle estimation unit estimates one of the estimated first angles based on an angle estimation algorithm.

3. The apparatus of claim 1, wherein, the third angle estimation unit estimates plural third angles, and when a number of the estimated third angles is greater than or equal to two, the third angle estimation unit estimates one of the estimated third angles based on an angle estimation algorithm.

4. The apparatus of claim 1, wherein the at least one first rotational angle sensor, the at least one second rotational angle sensor, and the at least one third rotational angle sensor are distinct from the at least one 2-axis angular velocity sensor and include at least one of an accelerometer sensor, an infrared sensor (IR sensor), an ultrasound sensor, a geomagnetic sensor, a camera, and a global positioning system (GPS).

5. The apparatus of claim 1, wherein the first angle estimation unit measures the first angle based on an output signal of the at least one first rotational angle sensor.

6. The apparatus of claim 5, wherein the second angle estimation unit estimates the second angle based on the measured first angle measured based on the output signal of the at least one first rotational angle sensor, and based on an output signal of the at least one 2-axis angular velocity sensor.

7. The apparatus of claim 6, wherein the third angle estimation unit estimates the third angle based on the measured first angle measured based on the output signal of the at least one first rotational angle sensor, the estimated second angle, and an output signal of the at least 2-axis angular velocity sensor.

8. The apparatus of claim 1, further comprising:
   a setting unit to selectively control to not estimate the third angle or to reset the estimated third angle to be a predetermined value, when the estimated third angle is outside a range of predetermined threshold values, with the estimated third angle being estimated based on a predetermined tilting angle and an output signal of the at least one 2-axis angular velocity.

9. The apparatus of claim 8, wherein the setting unit resets the estimated third angle based on information associated with the estimated third angle.

10. The apparatus of claim 1, wherein, the second angle estimation unit estimates plural second angles, and when a number of the estimated second angles is greater than or equal to two, the second angle estimation unit estimates one of the estimated second angles based on an angle estimation algorithm.

11. The apparatus of claim 1, wherein the second angle estimation unit estimates the second angle based on the measured first angle.

12. The apparatus of claim 1, wherein the third angle estimation unit estimates the third angle using the at least one third rotational angle sensor, a rotational angle corresponding to the first angle of the object with respect to the reference frame, and the at least one 2-axis angular velocity sensor.

13. The apparatus of claim 1, wherein the third angle estimation unit estimates the third angle using the at least one third rotational angle sensor, a rotational angle corresponding to the second angle of the object with respect to the reference frame, and the at least one 2-axis angular velocity sensor.

14. The apparatus of claim 1, wherein the third angle estimation unit estimates the third angle using the at least one third rotational angle sensor, a rotational angle corresponding to the first angle of the object with respect to the reference frame, a rotational angle corresponding to the second angle of the object with respect to the reference frame, and the at least one 2-axis angular velocity sensor.

15. An apparatus of sensing a motion, the apparatus comprising:
a first angle estimation unit to measure a first angle of an object with respect to a reference frame using at least one first rotational angle sensor;
a second angle estimation unit to estimate a second angle of the object with respect to the reference frame using at least one second rotational angle sensor and at least one 2-axis angular velocity sensor that is different from the at least one first rotational angle sensor; and
a third angle estimation unit to estimate a third angle of the object with respect to the reference frame using at least one third rotational angle sensor and the at least one 2-axis angular velocity sensor,
wherein, the second angle estimation unit estimates plural second angles, and when a number of the estimated second angles is greater than or equal to two, the second angle estimation unit estimates one of the estimated second angles based on an angle estimation algorithm.

16. A method of sensing a motion, the method comprising:
measuring a first angle of an object with respect to a reference frame using at least one first rotational angle sensor;
estimating a second angle of the object with respect to the reference frame using at least one second rotational angle sensor, a rotational angle corresponding to the first angle of the object with respect to the reference frame, and at least one 2-axis angular velocity sensor that is different from the at least one first rotational angle sensor; and
estimating a third angle of the object with respect to the reference frame using at least one third rotational angle sensor and the at least one 2-axis angular velocity sensor.

17. The method of claim 16, wherein the measuring of the first angle includes measuring plural estimated first angles, and when a number of the estimated first angles is greater than or equal to two, the estimating of the first angle estimates one of the estimated first angles based on an angle estimation algorithm.

18. The method of claim 16, wherein the estimating of the second angle includes estimating plural estimated second angles, and when a number of the estimated second angles is greater than or equal to two, the estimating of the second angle estimates one of the estimated second angles based on an angle estimation algorithm.

19. The method of claim 16, wherein the estimating of the third angle includes estimating plural third angles, and when a number of the estimated third angles is greater than or equal to two, the estimating of the third angle estimates one of the estimated third angles based on an angle estimation algorithm.

20. The method of claim 16, wherein the at least one first rotational angle sensor, the at least one second rotational angle sensor, and the at least one third rotational angle sensor are distinct from the at least one 2-axis angular velocity sensor and include at least one of an accelerometer sensor, an IR sensor, an ultrasound sensor, a geomagnetic sensor, a camera, and a GPS.

21. The method of claim 16, wherein the measuring of the first angle measures the first angle based on an output signal of the at least one first rotational angle sensor.

22. The method of claim 21, wherein the estimating of the second angle estimates the second angle based on the measured first angle, measured based on the output signal of the at least one first rotational angle sensor, and based on an output signal of the at least one 2-axis angular velocity sensor.

23. The method of claim 22, wherein the estimating of the third angle estimates the third angle based on the measured first angle, measured based on the output signal of the at least one first rotational angle sensor, the estimated second angle, and the output signal of the at least one 2-axis angular velocity.

24. The method of claim 16, further comprising:
controlling to selectively not estimate the third angle or reset the estimated third angle to be a predetermined value, when the estimated third angle is outside a range of predetermined angles, with the estimated third angle being estimated based on a predetermined tilting angle and the output signal of the at least one 2-axis angular velocity sensor.

25. The method of claim 24, further comprising:
resetting the estimated third angle based on information associated with the estimated third angle.

26. A non-tangible computer readable recoding medium comprising computer readable code to control at least one processing device to implement the method of claim 16.

27. The method of claim 16, wherein the estimating of the second angle includes estimating the second angle based on the measured first angle.

28. The method of claim 16, wherein the estimating of the third angle includes estimating the third angle using the at least one third rotational angle sensor, a rotational angle corresponding to the first angle of the object with respect to the reference frame, and the at least one 2-axis angular velocity sensor.

29. The method of claim 16, wherein the estimating of the third angle includes estimating the third angle using the at least one third rotational angle sensor, a rotational angle corresponding to the second angle of the object with respect to the reference frame, and the at least one 2-axis angular velocity sensor.

30. The method of claim 16, wherein the estimating of the third angle includes estimating the third angle using the at least one third rotational angle sensor, a rotational angle corresponding to the first angle of the object with respect to the reference frame, a rotational angle corresponding to the second angle of the object with respect to the reference frame, and the at least one 2-axis angular velocity sensor.

31. A method of sensing a motion, the method comprising:
measuring a first angle of an object with respect to a reference frame using at least one first rotational angle sensor;
estimate plural second angles of the object with respect to the reference frame based on the measured first angle, at least one second rotational angle sensor, a rotational angle corresponding to the first angle of the object with respect to the reference frame, and at least one 2-axis angular velocity sensor that is included in a separate physical sensor device from the at least one first rotational angle sensor;
estimating plural third angles of the object with respect to the reference frame using at least one third rotational angle sensor and the at least one 2-axis angular velocity sensor; and
controlling an operation of a mobile device based on motion information represented by the measured first angle, estimated plural second angles, and estimated plural third angles.

32. The method of claim 31, wherein the measuring of the first angle further comprises estimating the first angle of the object based on vertical information as measured by the at least one first rotational angle sensor and the at least one 2-axis angular velocity sensor.

33. The method of claim 31, wherein the measured first angle is a roll angle, the estimated plural second angles are pitch angles, and the estimated plural third angles are yaw angles.

34. The method of claim 31, wherein the at least one first rotational angle sensor, at least one second rotation angle sensor, and at least one third rotation angle sensor are included in a single rotational sensor device that can sense motion in three respective axes.

35. The method of claim 31, wherein the rotational sensor device and 2-axis angular velocity sensor are included in the mobile device, as the object.

36. The method of claim 31, wherein the controlling of the operation of the mobile device includes changing a displaying on the mobile device based on the motion information such that the displaying includes displaying only a portion of an entire image, with the displayed portion of the image changing based upon the motion information.

37. The method of claim 31, wherein the controlling of the operation of the mobile device includes changing a displaying on the mobile device based on the motion information such that the displaying includes displaying different user selectable menu items, with the displayed user selectable menu items changing based upon the motion information.

38. The method of claim 37, wherein the displayed user selectable menu items are selected by a user input device.

39. The method of claim 31, wherein the controlling of the operation of the mobile device includes displaying a rendered image provided to the mobile device until another rendered image is provided to the mobile device, and displaying the other rendered image upon receipt by the mobile device, with the mobile device receiving different rendered images based upon the motion information.

40. A non-tangible computer readable recoding medium comprising computer readable code to control at least one processing device to implement the method of claim 31.

41. The method of claim 31, wherein the estimating of the plural second angles includes estimating the plural second angles based on the measured first angle.

42. A mobile device sensing motion, the apparatus comprising:
   a display;
   a rotational angle sensor including a first rotational sensor, a second rotational sensor, and a third rotational sensor;
   a 2-axis angular velocity sensor, with the 2-axis angular velocity sensor being included in a separate physical sensor device from one or more sensor devices including the rotational angle sensor; and
   a controller controlling an operation of the mobile device based on sensed motion information defined by a measured first angle, estimated plural second angles, and estimated plural third angles, with the measured first angle of the mobile device being measured with respect to a reference frame using the first rotational angle sensor, the estimated plural second angles of the mobile device being estimated with respect to the reference frame using the second rotational angle sensor, a rotational angle corresponding to the first angle of the object with respect to the reference frame, and the 2-axis angular velocity sensor, and the estimated plural third angles of the mobile device being estimated with respect to the reference frame using the third rotational angle sensor and the 2-axis angular velocity sensor.

43. The mobile device of claim 42, wherein the measuring of the first angle further comprises estimating the first angle of the mobile device based on vertical information as measured by the first rotational angle sensor and the 2-axis angular velocity sensor.

44. The mobile device of claim 42, wherein the measured first angle is a roll angle, the estimated plural second angles are pitch angles, and the estimated plural third angles are yaw angles.

45. The mobile device of claim 42, wherein the rotational angle sensor is a single rotational sensor device that can sense motion in three axes.

46. The mobile device of claim 42, wherein the controlling of the operation of the mobile device includes changing a displaying on the display of the mobile device based on the motion information such that the displaying includes displaying only a portion of an entire image, with the displayed portion of the image changing based upon the motion information.

47. The mobile device of claim 42, wherein the controlling of the operation of the mobile device includes changing a displaying on the display of the mobile device based on the motion information such that the displaying includes displaying different user selectable menu items, with the displayed user selectable menu items changing based upon the motion information.

48. The mobile device of claim 47, wherein the displayed user selectable menu items are selected by a user input device.

49. The mobile device of claim 42, wherein the controlling of the operation of the mobile device includes displaying on the display a rendered image provided to the mobile device until another rendered image is provided to the mobile device, and displaying the other rendered image on the display upon receipt by the mobile device, with the mobile device receiving different rendered images based upon the motion information.

50. The mobile device of claim 42, wherein the controller estimates the plural second angles based on the measured first angle.

* * * * *